(No Model.)

T. J. THOMPSON.
CANT HOOK.

No. 436,322. Patented Sept. 9, 1890.

Witnesses
C. C. Burdine
J. R. Davis

Inventor
Thomas J. Thompson
per R. J. Du Bois,
his Attorney.

UNITED STATES PATENT OFFICE.

THOMAS J. THOMPSON, OF LEADVILLE, COLORADO, ASSIGNOR OF ONE-HALF TO MORGAN H. WILLIAMS, OF SAME PLACE.

CANT-HOOK.

SPECIFICATION forming part of Letters Patent No. 436,322, dated September 9, 1890.

Application filed March 29, 1890. Serial No. 345,830. (No model.)

*To all whom it may concern:*

Be it known that I, THOMAS J. THOMPSON, a citizen of the United States, residing at Leadville, in the county of Lake and State of Colorado, have invented certain new and useful Improvements in Cant-Hooks; and I do hereby declare the following to be a full, clear, and exact description of the invention, such as will enable others skilled in the art to which it appertains to make and use the same.

My invention relates to a self-acting cant-hook; and my object is to produce a hook in which it will not be necessary to elevate the handle in order to make the hook engage the log, but which will automatically engage and disengage the log in a positive manner regardless of the inclination of the handle portion.

With this purpose in view my invention consists in the peculiar features and combinations of parts, more fully described hereinafter, and pointed out in the claims.

Figure 1:
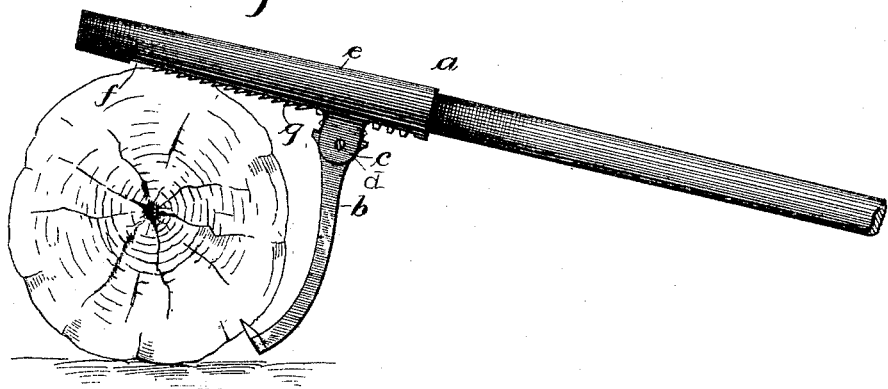
Figure 2:
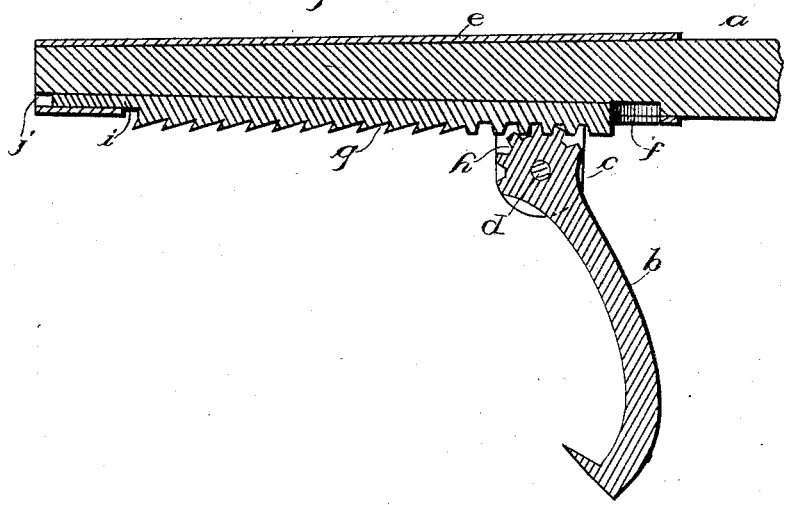
Figure 3:
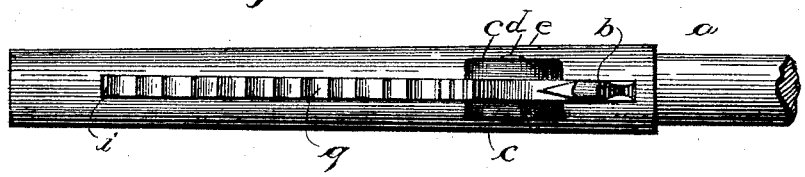

Referring to the accompanying drawings, Figure 1 represents a side view of the device, showing its application; Fig. 2, a longitudinal section, and Fig. 3 a bottom view.

The reference-letter $a$ represents the handle or lever, to which is hinged a hook $b$, by means of lugs $c$, and a pivot or fulcrum $d$, which passes transversely through the lugs. The end of the lever is provided with a ferrule $e$, having in its under side a longitudinal slot $f$, in which reciprocates a rack $g$. The lugs $c$ are located on the opposite sides of this rack, as will be more clearly seen in Fig. 3, and the inner end of the hook is provided with a toothed sector $h$, which meshes with the teeth of the rack, whereby the reciprocations of the latter actuate the former, as will be more fully explained hereinafter. The forward end of the rack is provided with a blank extension or guide $i$, which operates within a passage $j$ beneath the outer end of the ferrule $e$ and forms a continuation of the elongated slot $f$, and retains and guides the reciprocating rack during its movements. It will be observed that those teeth in the forward end of the rack which do not engage the toothed sector upon the hook are sharpened and made to slope forward, to engage the log like the teeth of an ordinary cant-hook.

In using my device the operator places the teeth of the rack upon the log in the usual way, and giving the handle a slight movement forward causes the rack to slide backward, carrying with it the toothed sector $h$, which throws the free end of the hook into engagement with the log, as shown in Fig. 1. In this way the hook is made to take hold without the necessity of inclining the handle to make the hook fall by gravity against the log. In my device a quick movement forward throws the point of the hook with considerable force into the log, thereby insuring a positive hold and preventing the loss of time caused by slipping, and several lost motions which have been necessary to get a good purchase when using the old style of hook. In releasing the hook the operator gives the handle a slight pull toward him or downward, and the reverse operation ensues, thereby immediately releasing the hook and bringing it in adjustment for a new purchase.

To still further describe my device and its operation, it is added that it consists of a compound lever in which the handle portion $a$ and ferrule end $e$ and hook $b$ form a lever of the second class, and the ferrule end $e$ forms the fulcrum, the hook when engaged the weight, and the handle the power. The hook itself forms a lever of the first class, in which the toothed sector is the power, the pivot $d$ the fulcrum, and the free end of the hook the weight.

It is evident that my invention might be changed in many slight ways which would naturally suggest themselves to a skilled mechanic; therefore I do not limit myself to the exact construction herein shown, but consider myself entitled to all such variations as come within the spirit and scope of my invention.

Having thus described my device, what I claim as new, and desire to secure by Letters Patent, is—

1. In a cant-hook, the combination of a handle portion provided with a ferrule having an elongated slot, a reciprocating bar operating in said slot and having teeth adapted to engage the log, a rack at one end of the bar, a pivoted hook, and a toothed sector formed at the base of said hook and engaged by said rack, substantially as described.

2. The combination of a handle portion, a ferrule provided with a longitudidal slot, a reciprocating rack within said slot, a pair of lugs located upon the opposite sides of the slot, and a hook provided with a toothed segment, arranged to engage said rack and fulcrumed between said lugs, all arranged and adapted to operate as described.

3. In a cant-hook, the combination of a handle having a ferrule provided with an elongated slot, a reciprocating bar operating therein and having teeth adapted to take hold on the log, a rack at one end of said bar, a projection from said bar fitting beneath the ferrule and confined by it, a pivoted hook, and a toothed sector at its base engaged by the rack of said reciprocating bar, substantially as and for the purpose described.

In testimony whereof I affix my signature in presence of two witnesses.

THOMAS J. THOMPSON.

Witnesses:
HENRY C. ROSE,
ALANSON ANDREWS.